US007929519B2

(12) United States Patent
Goldman et al.

(10) Patent No.: US 7,929,519 B2
(45) Date of Patent: Apr. 19, 2011

(54) POTS/PACKET BRIDGE

(75) Inventors: Joel Goldman, Randolph, NJ (US);
Lawrence Richard Rabiner, Berkeley Heights, NJ (US); Dennis Matthew Romain, Convent Station, NJ (US);
Patrick Michael Velardo, Jr., Manalapan, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1680 days.

(21) Appl. No.: 11/180,425

(22) Filed: Jul. 12, 2005

(65) Prior Publication Data

US 2005/0249198 A1    Nov. 10, 2005

Related U.S. Application Data

(63) Continuation of application No. 09/640,797, filed on Aug. 18, 2000, now Pat. No. 6,963,556, which is a continuation of application No. 08/946,965, filed on Oct. 8, 1997, now Pat. No. 6,134,235.

(51) Int. Cl.
*H04L 12/66* (2006.01)

(52) U.S. Cl. .................. 370/352; 370/401; 370/466

(58) Field of Classification Search .................. 370/401, 370/400
See application file for complete search history.

(56) References Cited

U.S. PATENT DOCUMENTS

| | | | |
|---|---|---|---|
| 4,556,972 A | * | 12/1985 | Chan et al. .................. 370/354 |
| 4,837,798 A | | 6/1989 | Cohen et al. |
| 5,459,779 A | | 10/1995 | Backaus et al. |
| 5,509,123 A | | 4/1996 | Dobbins et al. .......... 395/200.15 |

(Continued)

FOREIGN PATENT DOCUMENTS

CA    2191945    6/1997

(Continued)

OTHER PUBLICATIONS

Houghton T F et al., "A Packet Telephony Gateway for Public Network Operators", ISS '97. World Telecommunications Congress. (International Switching Symposium). Global Network Evolution: Convergence or Collision? Toronto, Sep. 21-26, 1997; [ISS. World Telecommunications Congress. (International Switching Symposium)], Toronto, Sep. 21, 1997, pp. 35-44, XP000704453.

(Continued)

*Primary Examiner* — Nathan Flynn
*Assistant Examiner* — Jason Harley

(57) ABSTRACT

A system and method for bridging the POTS network and a packet network, such as the Internet, uses a set of access objects that provide the interfacing and functionality for exchanging address and payload information with the packet network, and for exchanging payload information with the payload subnetwork and signaling information with the signaling subnetwork of the POTS network. The system includes a communications management object that coordinates the transfer of information between the POTS network and the packet network; a payload object that transfers payload information between the system and the payload subnetwork of the first communications network; a signaling object that transfers signaling information between the system and the signaling subnetwork of the first communications network in accordance with a signaling protocol associated with the signaling subnetwork; and a packet object that transfers payload and address information between the system and the second communications network in accordance with a communications protocol associated with the second communications network. An alternative embodiment uses a plurality of payload, signaling and packet objects to provide a scalable system.

23 Claims, 4 Drawing Sheets

U.S. PATENT DOCUMENTS

| | | | |
|---|---|---|---|
| 5,629,978 | A | 5/1997 | Blumhardt et al. |
| 5,675,507 | A | 10/1997 | Bobo, II |
| 5,724,412 | A | 3/1998 | Srinivasan |
| 5,742,596 | A | 4/1998 | Baratz et al. |
| 5,790,548 | A | 8/1998 | Sistanizadeh et al. |
| 5,828,666 | A | 10/1998 | Focsaneanu et al. |
| 5,870,565 | A | 2/1999 | Glitho |
| 5,884,032 | A | 3/1999 | Bateman et al. |
| 5,898,668 | A * | 4/1999 | Shaffer ............... 370/230 |
| 5,933,490 | A | 8/1999 | White et al. |
| 5,953,350 | A | 9/1999 | Higgins |
| 6,134,235 | A * | 10/2000 | Goldman et al. ........... 370/352 |
| 6,574,216 | B1 * | 6/2003 | Farris et al. .............. 370/352 |
| 6,963,556 | B1 * | 11/2005 | Goldman et al. ............ 370/352 |

FOREIGN PATENT DOCUMENTS

| | | |
|---|---|---|
| EP | 0 740 445 | 10/1996 |
| EP | 915596 A2 * | 5/1999 |
| JP | 2000267894 A * | 9/2000 |
| WO | WO-97/23078 A1 | 6/1997 |
| WO | WO97/31491 | 8/1997 |

OTHER PUBLICATIONS

Examination Report for EP 98 308 187.8-1249, May 4, 2010, copy consists of 6 pages.
"MCI Launches New Vault Network Architecture and V-Class Products Combining Internet and Conventional Networks", MCI Telecommunications Corporation, 1997, pp. 1-2.
"WANs & Internetworking", Lucent Goes for the Multimedia Gold, Netowrk World, Feb. 17, 1997, p. 11.
"Internet Telephony Basics", Dialogic WorldView; 5 pgs.
First Looks: "Volcaltec's Telephone Gateway—The Ultimate Internet Telephony Solution:", Computer Telephony, Sep. 1996, pp. 30, 32, 34, 36.
VocalTec Telephony Gateway—Next Generation Telephony, VocalTec, Northvale, NJ, 2 pgs.
"Computer Telephony—VocalTec's Internet Telephony Gateway", Product of the Year, VocalTec Telephony Gateway, Jan. 15, 1997, 1 pg.
VocalTec Telephony Gateway—Telephony Gateway White Paper/Product Overview, Jan. 15, 1997, 11 pgs.
"VocalTec Telephony Gateway—Next Generation Telephony", Jan. 15, 1997, 2 pgs.
"VocalTec Telephony Gateway—Features", Jan. 15, 1997, 2 pgs.
"VocalTec Telephony Gateway—Telephony Gateway Key Components", Jan. 15, 1997—3 pgs.
"VocalTec Telephony Gateway—System Requirements", Jan. 5, 1997, 2 pgs.
"VocalTec Telephone Gateway—Calling Options", Jan. 15, 1997, 2 pgs.
News & Info: In The Press: "Lucent Technologies Unviels Internet Access to Universal Fax, E-Mail and Voice Mail Mailbox", Sep. 17, 1996, 2 pgs.
"Internet Communications—White Paper: Lucent Technologies and the Internet—BCS and Data Dial Tone", Lucent Technologies, Jan. 24, 1997, 3 pgs.
"Communications—Intuity Message Manager Release 4.0 With CTI", Buhsiness Works, Lucent Technologies, Jan. 24, 1997, 3 pgs.
Intuity Universal Messaging, Business Works OnLine, Lucent Technologies, Jan. 24, 1997, 1 pg.
"Lucent Technologies Announces Internet Telephony Servers to Put Voice, Fax and Voice Mail on The Internet", In The Press, Lucent Technologies, 1996, 2 pgs.
"Lucent Technologies MultiMedia Communications eXchange", "Business Works", Jan. 26, 1997, 1 pg.
"MMCX Technology—Protecting Your Investment—Built on Industry Standards", MMCX Communications, Lucent Technologies, Jan. 26, 1997, 2 pgs.
"MMCX Technology—Protecting Your Investment—MMCX Server", MMCX Communications, Lucent Technologies, Jan. 26, 1997, 1 pg.
"MMCX Technology—Protecting Your Investment—System Capacities", MMCX Communications, Lucent Technologies, Jan. 26, 1997, 2 pgs.
"The Graphical User Interface", MMCX Communications, Lucent Technologies, Jan. 26, 1997, 1 pg.
"Vienna Thru.way", Vienna Systems Products, Oct. 20, 1996, 3 pgs.
"DataCom Hot Products", Vienna Systems—Best of 96, 1997, 2 pgs.
"Intranet to PSTN Switching", Vienna Systems Products, Jan. 15, 1997, 2 pgs.
"Intranet/Internet Switching", Vienna Systems Products, Oct. 20, 1996, 2 pgs.
"Vienna Voice.Way Srever", Vienna Systems Products, Oct. 20, 1996, 4 pgs.
WorldWideWeb: Connect, Netspeak,Com/press; "New Gateway to Offer Virtual Second Line for Internet Users", Boca Raton, Fla., Aug. 15, 1997, 2 pgs.
WorldWideWeb: Telstra.com.au/press, Telstra Media Release; "New Gateway to Offer Virtual Second Line for Internet Users", Aug. 15, 1997, 2 pgs.
Lucent Technologies, "Getting Down to Business out in Cyberspack", pp. 1-8 published date—unknown, http://www.lucent.com/intl/mags/tech news.html;.
Lucent Technologies, BCR Product Review "Lucent Internet Server", May 7, 1997, pp. 1-2, http://www.bcr.com/bcrmag/059707.htm;.
Cheryl Gerber, Computerworld, "The Net of Internet Telephony", Mar. 1997, pp. 1-6, http://www.computerworld.com/home/online9697.nsf/all/9703TESL9703te-1;.
Chris Bucholtz, Internet Telephony News of the Week, "News of the Week, D-Day for IP", Apr. 7, 1997, pp. 1-2, http://www.internettelephony.com/archive/4.7.97/NOTW.html;.
GTE Showcase, VoIP, Published date -unknown, http://www.gte.com/Showcase/voip/Feature.html;.
Telephony World.com., "Industry Studies and Reports Presented by Faulkner Information Systems", published date -unknown, pp. 1-3, http://www.telephonyworld.com/marketng/voipsuite.htm;.
Inter-Fone-Internet Telephony, "What is Inter-Fone?", published date -unknown, pp. 1-2, http://www.inter-fone.com/whatis.html;.
Inter-Fone—"How Inter-Fone Works", published date -unknown, pp. 1-2, http://www/inter-fone.com/how.html.
Inter-Fone, "How it Works", published date-unknown, pp. 1-2http://www.inter-fone.com/pc3pc.html.
EP Examination Report for EP 98 308 187.8, dated Dec. 28, 2007, copy consists of 7 pages.
International Telecommunication Union, "ITU-T Recommendation H.323", Nov. 1996.
Rabbage R., et al.: *Internet Phone-Changing the Telephony Paradigm?*, BT Technology Journal, GB, BT Laboratories, vol. 15, No. 2, Apr. 1, 1997, pp. 145-157.
Simeonov P L., et al.: *Ingate: A Distributed Intelligent Network Approach to Bridge Switching and Packet Networks*, Proceedings of the International Conference on Computer Communications and Networks, Sep. 1997 XP002073675.
White P P: *RSVP and Integrated Services in the Internet: A Tutorial*, IEEE Communications Magazine, US, IEEE Service Center, Piscataway, NJ, vol. 35, No. 5, May 1, 1997, pp. 100-106, XP000657115.

* cited by examiner

POTS/PACKET BRIDGE

This application is a continuation of U.S. patent application Ser. No. 09/640,797 filed Aug. 18, 2000 now U.S. Pat. No. 6,963,556 entitled POTS/PACKET BRIDGE, which is a continuations of, and claims priority to U.S. application Ser. No. 08/946,965, filed Oct. 8, 1997, now U.S. Pat. No. 6,134,235 issued Oct. 17, 2000 entitled POTS/PACKET BRDIGE. The aforementioned related patent applications are herein incorporated by reference.

TECHNICAL FIELD

This invention relates to communications in general and, more particularly, to a way of bridging together the telephone network with a packet network.

BACKGROUND OF THE INVENTION

A. The POTS Network

The Plain Old Telephone Service (POTS) network, which has been in existence for over 100 years, is well designed and well engineered for the transmission and switching of 3 kHz voice calls. The POTS network is a real-time, low-latency, high reliability, moderate fidelity voice telephony network. It is not designed for, nor especially well suited for, other forms of communications, including wideband speech or audio, images, video, fax, and data. The POTS network is inherently "telephone" or "handset" oriented and is driven by the need of real-time voice telephony.

There are approximately 270 million users of the POTS network in the United States, making POTS access nearly ubiquitous throughout the US. On the other hand, the POTS network has high access costs, and for international calls, settlement costs.

1. Voice and Signaling Circuits

Today's POTS network includes a plurality of subnetworks. The two primary subnetworks are a circuit-switched voice subnetwork and an out-of-band signaling subnetwork. In addition, the POTS network includes other packet subnetworks used for operations and network management functions.

The POTS circuit-switched voice subnetwork includes voice-grade circuits that can carry voice signals or data at multiples of a basic 64 kilobits/second rate. The voice subnetwork includes a multiplicity of Service Switching Points (SSP) that are used to set up circuit-switched connections that carry voice traffic or data traffic (i.e., the "payload") on the POTS network. Each SSP may be a switch used by a Local Exchange Carrier (LEC), such as a 5ESS® switch (5E) made by Lucent, or a switch used by an InterExchange Carrier (IXC), such as a 4ESS® switch (4E) made by Lucent.

The POTS signaling subnetwork is itself a packet-switched network, denoted as Signaling System 7 (SS7). The SS7 signaling subnetwork carries digital information which assists in fast call setup and routing, as well as providing transaction capabilities using remote database interaction. The SS7 signaling subnetwork includes a series of paired components connected to an SSP. Typically, each of the paired components for the SS7 signaling subnetwork includes one or more Signal Transfer Points (STP) and one or more Service Control Points (SCP). Each STP and SCP provides, respectively, a router and a database used to implement call setup, call routing, call control and the logic (or programs) and related information functions used to provide advanced communications services over the POTS network. Details of STPs and SCPs, their operation, and how they interact with SSPs are well-understood by those skilled in the art.

The SS7 signaling subnetwork also includes a protocol (which, in turn, includes a series of sub-protocols). Thus, for example, under the SS7 protocol, it is possible to automatically transfer information about the calling party to the called party (i.e., the so-called "Caller ID"). Furthermore, e.g., the SS7 signaling subnetwork and protocol interacts with the voice subnetwork so as to enable a query from an SSP in the voice subnetwork to a Service Control Point (SCP) database in the SS7 subnetwork for determining how to route a call, such as a toll-free (e.g., "800") call. Thus, e.g., the SCP can return to the SSP a routing number corresponding to the dialed "800" number. Additional call features or services utilizing the interaction capabilities of the voice and signaling subnetwork of the POTS network are well known.

2. Interactive Voice Response Systems

Using known interactive voice response (IVR) techniques, callers can directly update database records or select specific information for retrieval by, e.g., entering touch-tones or using voice commands. Retrieved textual information can be converted to speech and played over the phone, or sent directly to the caller as a fax document. As a result, customers can access information or place orders at their convenience without waiting for a service representative. Businesses benefit by reducing costs associated with attendants and service representatives and by increasing customer satisfaction.

B. Packet Networks

Packet networks are general-purpose data networks which are not tied to fixed-bandwidth circuits. Instead, they are designed to transmit bits (in the form of a packet of fixed or variable length) only when there are bits to transmit. Packet networks evolved independently of telephone networks for the purpose of moving bursty, non-real-time data among computers and are distinguished by the property that packet communications are routed by address information contained in the data stream itself.

Packet networks are especially well suited for sending stored data of various types, including messages, fax, speech, audio, video and still images, but are not well suited for sending real-time communication signals such as real-time speech, audio, and video signals. Typically, one accesses a packet network through a client program executing on a personal computer (PC), and so packet networks are inherently "PC" oriented, and client/server driven. Packet networks provide access to distributed databases and have excellent search capabilities.

There are approximately 30 million users of packet networks in the US; this number of users is growing rapidly and will continue to do so over the next decade. Today, the Internet (the largest and most renowned of the existing packet networks) connects over 4 million computers in some 140 countries. The Internet is implemented using a large variety of connections between those millions of computers. These interconnected computers can support applications, such as electronic mail and the World Wide Web, which facilitate communications between persons across the U.S. or around the globe.

Among the connections between computers typically found on the Internet are routers. Routers serve to send packets along to their destination by examining packet headers to determine the destination address; routers often send packets to another router closer to the destination.

Access to the Internet may be obtained through a point of presence (POP), typically through a server connected to one of the networks that make up the Internet. A large company or business may establish a POP as its own direct connection to the Internet; individuals or small businesses may typically access the Internet through a service provider which may provide a POP for, potentially, a multitude of individuals and businesses.

The Internet's global and exponential growth is common knowledge today. The recent developments of browsers for World Wide Web interfaces and information navigation software, such as a multitude of Web search engines (such as, e.g., Lycos or Alta Vista), coupled with a continuously growing number of public access providers, are making the Internet a fundamental component of the information age, if not the information super highway itself. Users typically communicate over the Internet using a combination of hardware and software providing interconnectivity that is compatible with the standard, namely Transmission Control Protocol/Internet Protocol (TCP/IP).

Several alternate forms of communication have developed which utilize either the POTS network or packet networks (and sometimes both). For example, facsimile (fax) communication is now a commonplace option for transmitting copies of documents over the POTS network. Electronic messaging (e.g., e-mail) is a growing phenomenon for those who use a packet network, particularly the Internet, for communications. In addition, many companies today are using packet networks, locally or internally within the company, which are modeled in functionality based upon the Internet. These packet networks, denoted "intranets," are typically private networks owned or controlled by the company or corporate user. Packets are moved over intranets using the Internet Protocol (IP), and often the same software used in connection with the Internet (e.g., Web browsers) is also used in connection with intranets. Intranet networks are often established to connect to the Internet through a firewall (i.e., a hardware/software combination designed to restrict unauthorized access to the intranet from the outside world).

As the Internet grows, more organizations are publishing information on a "site" on the World Wide Web (Web site). Furthermore, generally available and excellent search capabilities can locate a particular piece of information quickly from this globally-distributed database.

A World Wide Web site on the Internet typically resides on a computer known as a server, which is accessed through the Internet by a person (or a client) utilizing a computer, such as a PC. A Web site consists of one or more Web pages comprising scripts written in Hyper Text Markup Language (HTML) and typically resides on a server compatible with HyperText Transport Protocol (HTTP, a protocol for interfacing with the Internet). Pages at a Web site are typically accessible and viewed by the person using the PC through software called a Web browser, which typically resides on the person's PC. A Web browser, such as the one by Netscape, interprets Web page HTML scripts to provide a graphical user interface that allows easy access to various services over the Internet. Equivalently, Web sites internal to and locatable over a corporate intranet may be set up and accessed in a like manner using the same or virtually the same software (e.g., a Web browser). Such Web sites internal to a corporate intranet are typically HTTP compatible and addressable using Uniform Resource Locator (URL) techniques, and contain Web pages comprising HTML scripts.

Persons may browse the World Wide Web for virtually any kind of information, including information having content derived from one or more media, such as words, sounds or images. Increasingly, businesses are establishing Web sites as a means of providing information to and attracting potential customers, and Web sites are emerging as a means of transacting business. One may locate a company's Web site by, e.g., using one of a number of existing search engines available over the Internet, or browsing other Web sites containing links to the company's Web site, or entering directly the URL, which represents an address for the Web site. Typically, Web browsing takes place in the context of an interactive communication session, where one may, for example, direct the Web browsing session by choosing to follow hypertext links found in Web sites and/or may respond to information located at various Web sites.

C. Integration of the POTS and Packet Networks

Recently, several new evolutionary systems have emerged with the goal of integrating the POTS and packet networks, including the introduction of packet telephony and "hop-on hop-off" servers.

1. Packet Telephony

An Internet-related development is packet telephony. Packet telephony involves the use of a packet network, such as the Internet, for telecommunicating voice, pictures, moving images and multimedia (e.g., voice and pictures) content. Instead of a pair of telephones connected by switched telephone lines, however, packet telephony typically involves the use of a "packet phone" or "Internet phone" at one or both ends of the telephony link, with the information transferred over a packet network using packet switching and packet routing techniques.

Packet telephony systems were created with the goal of providing real-time speech communications over packet networks. The basic idea of packet telephony is (1) to use the sound board of a multimedia PC to digitize speech into bits; and (2) to use the processor in the computer to compress the bitstream, packetize it, and then send the result over a packet network to another multimedia PC with the same or equivalent functionality. Although the basic idea is feasible, the resulting real-time voice communications experience is of low quality, albeit at low cost. Some of the drawbacks are:

- long transmission delays (due to packet size, packet buffering, packet overheads and routing delays)
- lost and delayed packets (due to network congestion)
- poor quality of the coded voice (due to the use of low complexity speech coders)
- difficulty of finding the Internet Protocol (IP) address of the person at the destination
- need to call people who did not have access to the packet network Several improvements in these areas have been made since the initial introduction of packet telephony, and others have been suggested (e.g., reservation protocols such as RSVP).

2. HOHO Servers

As packet telephony grew in popularity, the need to call people who did not have access to the packet network led to the creation of Hop-on Hop-Off (HOHO) servers. The development of Hop-on Hop-Off servers provided a mechanism for PC-initiated telephone calls on a packet network to connect with the POTS network and terminate at a customer's telephone handset or vice-versa. The HOHO or server brings the packet network and POTS network together at a common gateway interface, which bi-directionally converts IP packets into voice and signaling information, such as the sequence of messages used to set up, bridge, and tear down calls. In this way, voice communication is established across the packet and POTS networks.

3. Call Center-Based Telephony

Another recent development in linking together the POTS and packet networks is the call center-based system developed by Genesys Telecommunications Laboratories, among others. In a typical call center-based scenario, a customer finds a product/service, while browsing the Web, for which more information is desired. If the particular product/service provider maintains both a Web server and a call center, the customer, along with the Web connection, can be linked to a call center representative in the following way. The customer is asked to click on a button on the PC screen which requests customer information (e.g. home telephone number, name, etc.). The Web server passes the information to the database server in the call center system, which initiates a POTS call to the customer and connects the call to a call center representative. At the same time, the Web page that the customer is looking at may be passed to the call center representative, along with side information such as the length of time that the customer has been looking at the page, the previous pages which have been looked at, etc. In this manner, the customer maintains a voice connection to the call center representative, as well as synchronization between what the call center representative sees on the PC screen and what the customer sees on the PC screen.

While the systems described above provide some limited usefulness for individualized applications, none of these systems provide a comprehensive means for combining the POTS network and a packet network (such as the Internet) in a way that takes full advantage of the signaling and real-time signal processing capabilities present in the POTS network. For example, current packet telephony systems do not take advantage of the SS7 signaling subnetwork and protocols to assist call setup and routing. Further, none of the current systems that enable packet telephony using a POTS telephone connection at one or both ends have the capability to intelligently make switching or routing decisions between the POTS network and packet network based upon considerations such as desired quality, time, cost, bandwidth or other considerations.

What is desired is a way to combine the POTS network and a packet network, taking full advantage of the signaling capabilities present in the POTS network as well as the addressing capabilities inherent in a packet network, to seamlessly combine the networks for flexible and optimal communications based upon considerations such as desired quality, time, cost or bandwidth.

SUMMARY OF THE INVENTION

The present invention provides a way of bridging the POTS network and a packet network, such as the Internet, using a system of access objects that provide the interfacing and functionality for exchanging address and payload information with the packet network, and for exchanging payload information with the payload subnetwork and signaling information with the signaling subnetwork of the POTS network. The system includes a communications management object that coordinates the transfer of information between the POTS network and the packet network; a payload object that transfers payload information between the system and the payload subnetwork of the first communications network; a signaling object that transfers signaling information between the system and the signaling subnetwork of the first communications network in accordance with a signaling protocol associated with the signaling subnetwork; and a packet object that transfers payload and address information between the system and the second communications network in accordance with a communications protocol associated with the second communications network. In an alternative embodiment, a plurality of payload, signaling and packet objects may be utilized to provide a scalable system.

DETAILED DESCRIPTION

The present invention is directed to a POTS-packet bridging device that combines the POTS network and a packet network (such as, e.g., the Internet or an intranet) in a way that takes full advantage of the signaling capabilities present in the POTS network as well as the addressing capabilities inherent in a packet network. The bridging device of the present invention will be referred to herein as the "POTS/Packet Bridge" and is intended to seamlessly combine the POTS network and a packet network for flexible and optimal communications based upon considerations such as desired quality, time, cost or bandwidth. Further, the POTS/Packet Bridge will enable customers to easily invoke enhancements to POTS services such as messaging and mobility, by using point-and-click interfaces on their PC's to open up a range of services that is broader than that enabled by a simple telephone interface. Additionally, users having only a telephone could gain access to information from databases, formerly available only on the packet network, through emerging text-to-speech and voice recognition network interfaces. Moreover, new services combining the simultaneous delivery of multimedia content to a PC and real-time communications (e.g. voice, audio, video) over a telephone become possible with the integration of the POTS and packet networks using the POTS/Packet Bridge of the present invention.

The POTS/Packet Bridge described herein exploits the outstanding strengths of the both of its network constituents, e.g.:
  The POTS network provides low-latency, high reliability, moderate fidelity real-time voice/data telephony;
  The packet network transmits data of all types and provides point-and-click access to distributed databases with excellent search capabilities.

In accordance with the present invention, the POTS/Packet Bridge has several important attributes:
  The POTS/Packet bridge interconnects with the existing POTS and packet networks, which remain essentially intact, while leveraging the outstanding strengths of each network
  Through the POTS/Packet Bridge, each network can be used to control the other in a synergistic way, so as to allow flexible communications which can be optimized for quality of service, time, cost, etc.
  The POTS/Packet bridge will enable delivery of a broad set of new multimedia services which provide significant improvements in ease-of-use, convenience, ubiquity, quality of service, etc.

Figure 1:
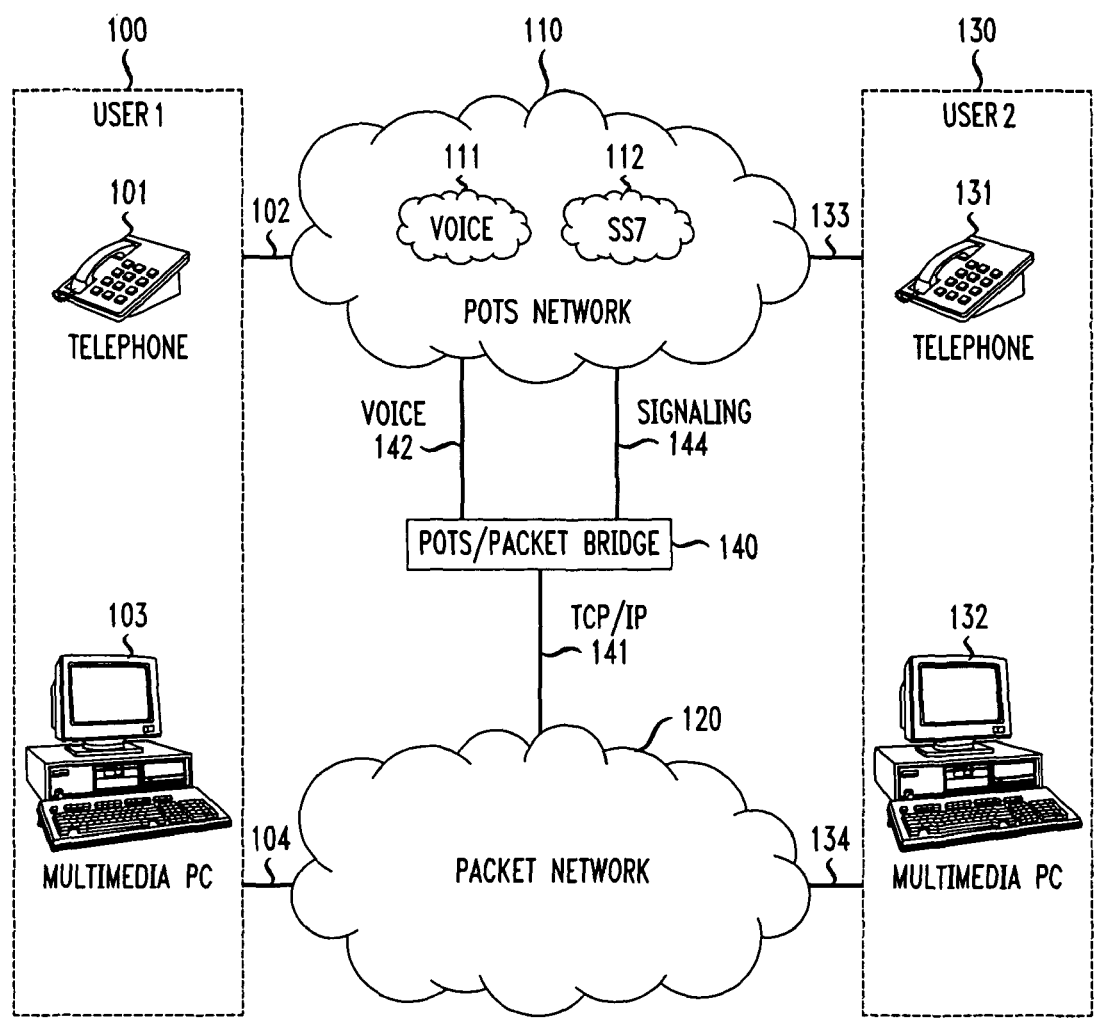
FIG. 1 is a diagram showing the relationship of the POTS network, a packet network (such as the Internet or an intranet) and the POTS/Packet Bridge of the present invention.

The POTS/Packet Bridge of the present invention comprises a new network element to bridge the POTS network with a packet network, such as the Internet. FIG. 1 is a diagram showing the relationship of the POTS network, a packet network (such as the Internet or an intranet) and the POTS/Packet Bridge of the present invention. Interconnection of the POTS network and a packet network using the POTS/Packet Bridge of the present invention will now be described with reference to FIG. 1, in the context of two potential users. The first user 100 has a telephone 101 for engaging in voice-grade communications (voice or data) over POTS network 110 utilizing telephone connection 102, which may be accomplished typically through an area LEC or other means customary for establishing a connection with the POTS network. User 100 also has a multimedia PC 103 for interacting with packet network 120, which may be any one of a number of exemplary packet networks such as the Internet or another packet network used for data communications. User 100 may establish a TCP/IP-compatible connection 104 with packet network 120 using any one of a number of known methods for connecting a PC to a packet network, including use of a modem to dial into a service provider, e.g. an Internet service provider such as AT&T WorldNet™ or through a local area network (LAN) linked to the packet network.

POTS network 110 is comprised of voice-grade circuit switched subnetwork 111 for carrying voice signals, and signaling subnetwork 112, depicted in FIG. 1 as the SS7 signaling subnetwork.

A second user 130 is depicted in FIG. 1 having a telephone 131 and multimedia PC 132. User 130 may engage in voice-grade communications (voice or data) over POTS network 110 utilizing telephone connection 133, and in packet communications using TCP/IP-compatible connection 134. Those skilled in the art will recognize that a user (such as user 100 or user 130) may, alternatively, establish a connection to the packet network through a Web server which may host a Web site associated with the user.

Those skilled in the art will understand that in reality there are millions of individual and business users having interconnections with the POTS network and a packet network (such as the Internet), and will further appreciate that the two users shown in FIG. 1 are for purposes of example only and that the advantages of the present invention are maintained with individual or business users having a variety of communications configurations.

POTS/Packet Bridge 140 is interconnected with both POTS network 110 and packet network 120. Communication through packet network 120 is obtained via one or more TCP/IP connections, one such TCP/IP connection being shown illustratively as 141. POTS/Packet Bridge 140 is also connected to POTS network through one or more connections carrying voice grade signals. Methods for connecting POTS voice grade signals to the POTS/Packet Bridge in accordance with the intent of the present invention will be evident to those skilled in the art.

POTS/Packet Bridge 140 is also connected to POTS signaling subnetwork 112 through connection 144. POTS/Packet Bridge 140 includes an interface compatible with the signaling subnetwork. For purposes of maintaining the security of the signaling subnetwork, POTS/Packet Bridge 140 may include a firewall isolating it from signaling subnetwork 112.

Optionally, the POTS/Packet Bridge may also have connections to POTS network management and billing functions. This may be accomplished by adding so-called operations, administration, maintenance and provisioning (OAM&P) functionality to the POTS/Packet Bridge. Methods for providing OAM&P functionality are well-known to those skilled in the art.

Basic Architecture

An exemplary architecture for the POTS/Packet Bridge system of the present invention used for interconnecting the POTS network and a packet network (such as the Internet or an intranet) will now be described with reference to FIG. 2A (reference numbers in FIG. 2A beginning with a '1' correspond to like-numbered references in FIG. 1).

Figure 2A:
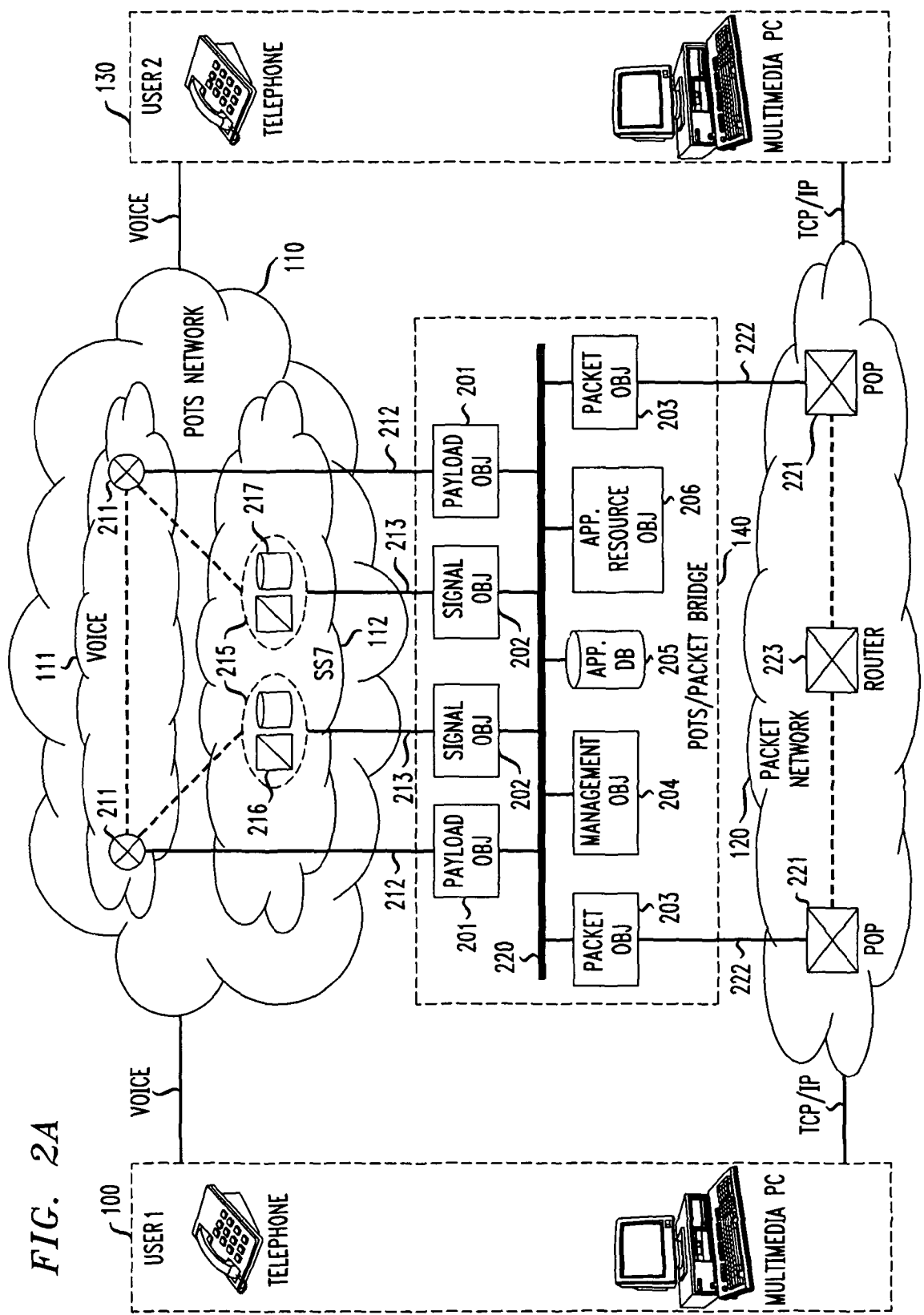
FIG. 2A shows an exemplary architecture for the POTS/Packet Bridge system of the present invention.

As shown in FIG. 2A, POTS/Packet Bridge 140 is comprised of a set of communications-related access objects which communicate over a communications path 220, including one or more POTS payload objects 201, one or more POTS signaling objects 202, and one or more packet interface objects 203; and a communications management object 204. Additionally, POTS/Packet Bridge 140 may include other optional objects, such as one or more application databases 205, and one or more application resource objects 206.

The POTS/Packet Bridge described with reference to FIG. 2A may be implemented using a computer-based object-oriented communications platform having object-oriented communications functions useful for interfacing with a communications network, such as the POTS network. Illustratively, one such object-oriented communications platform is the AT&T Information Services Platform (ISP). The ISP platform utilizes a software layer called SP middleware, which is a middleware package developed by Amteva Technologies. This software layer is a multimedia, network object-based, open, enhanced-services software platform having reusable network object modules to provide the basis for developing open, modular network subscriber services. Further information about this software layer for ISP may be found in the following manuals published by Amteva: "Developing Applications with APIs," "Profile Object API Reference," "Telecom Object API Reference," and "SP Administrator's Guide." Additional information about the SP middleware may also be found in SP product brochures published by Amteva in 1996, as well as in an online article "SP Architecture White Paper," published at the Amteva Web site.

Alternatively, the POTS/Packet Bridge system of the invention described herein may be implemented using computer-based hardware and conventional programming techniques along with any hardware necessary for implementing the appropriate interfaces with the POTS network and the packet network, and in other ways evident to those skilled in the art.

Thus, any one or more objects as described herein may be implemented using a computer-based object-oriented communications platform having object-oriented communications functions, or on a single computer-based platform, such as on a board or in a server having the appropriate interfacing, or in a set of such platforms. Furthermore, those skilled in the art will recognize that the objects described herein may include or be implemented as part of a computer-based system having functionality for handling communications, such as a gateway.

Illustratively, then, an object utilized in the present invention, such as the communications management object, may comprise a computer program stored on a computer-readable medium such that the program, when executed by a computer (or processor), causes the object to interact with one or more networks and/or another object to accomplish its function. Those functions for the various objects are described below.

The objects and databases included in POTS/Packet Bridge 140 may be linked or coupled together through communications path 220. Communications path 220 may include any one of a number of known ways for interconnecting computer-based objects, such as, e.g., through a common bus within a platform, or a network, such as a packet network. Implementation of communications path 220 may include, e.g., an intranet, a Local Area Network (LAN), an ATM network, an Ethernet network, a frame relay network, etc.

In accordance with the present invention, POTS/Packet Bridge 140 is interconnected with the voice/data subnetwork of POTS network 110 (which comprises a network of switched voice-grade circuits 111 and signaling subnetwork 112) using the above-referenced communications objects as described below. As shown in FIG. 2A, voice subnetwork 111 for POTS network 110 includes one or more SSPs 211 (for illustrative purposes, two SSPs are shown). POTS/Packet Bridge 140 uses POTS payload object 201 to interface with SSP 211 over a communications link 212 and provide access to payload information (i.e., voice/data traffic) residing on the POTS network. That is, payload object 201 transfers information between the POTS/Packet Bridge and the payload subnetwork of the POTS network. Implementation of payload object 201 may, as discussed more generally above, be implemented, e.g., using a computer program stored on a computer-readable medium, such that the program, when executed by a computer (or processor), would cause the payload object to interact with SSP 211 in order to obtain access to payload information from the POTS network and to send payload information to the POTS network.

POTS payload object 201 would include the necessary interfaces and follow the appropriate POTS circuit protocols to enable communications with an SSP 211. Interfaces and protocols for communicating with POTS circuit switches are well-known to those skilled in the art (e.g., the AT&T ISP platform includes one or more objects for handling these functions). For example, payload object 201 may include an interface and logic appropriate for sending to or receiving from voice subnetwork 111 dual tone multifrequency (DTMF) digits. As another example, payload object 201 may include an interface and logic appropriate for sending to or receiving from voice subnetwork 111 facsimile transmissions.

Payload object 201 may also include or be accompanied by a firewall or other means of security to protect the integrity of voice subnetwork 111 and/or of the POTS/Packet Bridge. Means for implementing a communications firewall are well-known to those skilled in the art.

In accordance with the present invention, POTS/Packet Bridge 140 also includes connections to the signaling subnetwork 112 of POTS network 110. POTS signaling subnetwork 112 includes one or more paired components 215 connected to an SSP. Each paired component includes an STP 216 and an SCP 217. A connection between POTS/Packet Bridge 140 and a paired signaling component 215 is implemented through POTS signaling object 202 via communications link 213 to paired signaling component 215. Signaling object 202 contains the signaling interface and logic appropriate for following the protocol (e.g., the SS7 protocol for the SS7 signaling subnetwork) necessary for communicating with signaling subnetwork 112. That is, signaling object 202 transfers information between the POTS/Packet bridge and the SS7 signaling subnetwork by translating information sent to or received from the signaling subnetwork of the POTS network in accordance with the SS7 signaling protocol associated with the signaling subnetwork. In addition, because POTS signaling subnetwork 112 is typically maintained as a highly secure network, signaling object 202 may advantageously include or be accompanied by a firewall or other means of security to protect the integrity of POTS signaling subnetwork 112 and/or of the POTS/Packet Bridge.

POTS/Packet Bridge 140 is interconnected to packet network 120 through a TCP/IP-compatible connection or communications link 222 between packet object 203 and POP 221 for packet network 120 (illustratively shown in FIG. 2A are two POPS 221 with router 223 for routing messages between them). Each packet object 203 is a resource having logic to handle packetization, i.e., the merger of address information and voice/data traffic (i.e., payload) into IP packets (i.e., containing an address in the packet header and data payload) suitable for transmission over a TCP/IP-compatible communications link. Packet object 203 also handles depacketization, i.e., the conversion of IP packets (i.e., address information, contained in packet headers, and packet data payload) into address information and voice/data traffic (i.e., the message or payload). That is, packet object 203 transfers information between the POTS/Packet Bridge and the packet network by translating payload information and address information sent to or received from the packet network in accordance with the TCP/IP communications protocol associated with the packet network.

Packet object 203 also provides the interfacing between POTS/Packet Bridge 140 and packet network 120. In addition, packet object 203 may also provide Web interfacing (thus, e.g., packet object 203 may be a proxy for an HTTP server).

Further, packet network 120 may have varying degrees of security, and thus packet object 203 may include or be accompanied by a firewall or other means of security to protect the integrity of packet network 120 and/or of the POTS/Packet Bridge.

Optionally, signal processing capability for processing the payload information, such as converting the format of the payload (i.e., media conversion; one example being text to speech or vice versa), or performing compression or enhancement of the payload information, could be included in payload object 201, or in packet object 203. Alternatively, as described below, such functionality could be provided in a separate applications resource object 206. Techniques for format conversion, compression and enhancement are well known to those skilled in the art.

Communications management object 204 provides the overall system management for the POTS/Packet Bridge. Communications management object 204 also coordinates the transfer of information between POTS network 110 and packet network 120, such as scheduling and controlling setup, tear down, switching, bridging, routing and redirection for calls initiated on either the POTS or packet network of communications between and among POTS network 110 and packet network 120. OAM&P functions may be provided to the POTS/Packet Bridge through communications management object 204.

The combination of one or more payload objects 201, one or more signaling objects 202, one or more packet objects 203 and a communications management object 204 enables the POTS/Packet Bridge of the present invention to control the flow of signaling and addressing information, and voice/data signals between POTS network 110 and packet network 120. This includes, e.g., passing communications between POTS network 110 and packet network 120 via the capability for a traditional POTS communication to hop-on to the packet network and be delivered as a packet communication, and the capability a packetized communication to hop-off to the POTS network and be delivered as a traditional POTS communication.

In addition to the objects described above, additional objects may be provided on an optional basis to provide applications support. Optional application database object 205 may be linked to the other elements of the POTS/Packet Bridge via communications path 220, to provide POTS/Packet bridge 140 with a data set that can support a variety of service applications making use of the POTS/Packet Bridge. One example of an application database object 205 is an active user registry database (AUR) that stores communications contact information about users, which may include telephone numbers, facsimile (FAX) numbers, mobile telephone numbers, e-mail addresses, etc. An AUR database object may also include a set of user profiles together with preferred communications options (i.e., ways of being reached) dependent upon factors such as, e.g., time-of-day, day-of-week, or the identity of the person trying to initiate the communication.

In addition to the basic addressing, routing, payload handling and communications management functions described above, POTS/Packet Bridge 140 may also include one or more optional application resource objects 206 linked to the other elements of the POTS/Packet Bridge via communications path 220. In accordance with the present invention, application resource objects 206 may provide a wide range of resources for communications services, such as media conversion (e.g., text-to-speech, automatic speech recognition), messaging, Web interaction, and accompanying service logic which links these elements to provide enhanced services. Applications resource object 206 may, alternatively, include the capability of performing compression or enhancement of payload information. Thus, e.g., an application resource object 206 may comprise a universal messaging node that integrates various types of messages including e-mail, fax, voice mail, video mail, etc., and provides access via either the POTS or the packet network to all messages.

Scalable Architecture

In an alternative embodiment of the present invention, a scalable architecture for the POTS/Packet Bridge of the present invention used for interconnecting the POTS network and a packet network will now be described with reference to FIG. 2B (reference numbers in FIG. 2B beginning with a '1' correspond to like-numbered references in FIG. 1). As is the case with the embodiment of the POTS/Packet Bridge in FIG. 2A, the architecture described with reference to FIG. 2B may be implemented in a variety of ways as described above. For example, the embodiment in FIG. 2B may be implemented by using a computer-based object-oriented communications platform, such as the AT & T Information Services Platform (ISP), having object-oriented communications functions useful for interfacing with the POTS network. Other ways of implementing the embodiment of the POTS/Packet Bridge of the invention described herein will be evident to those skilled in the art.

Figure 2B:
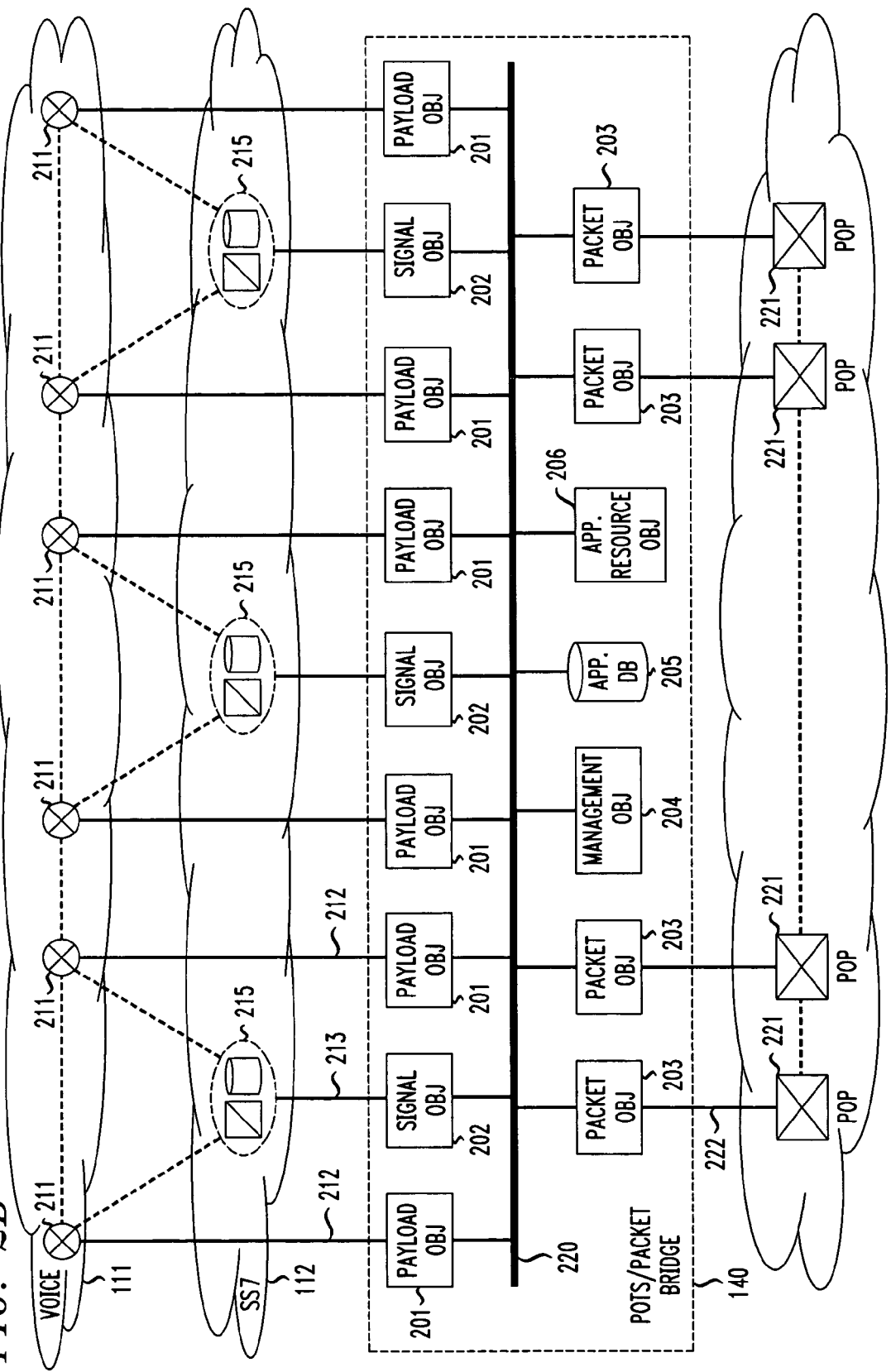
FIG. 2B shows an alternative scalable architecture for the POTS/Packet Bridge of the present invention.

Depicted in FIG. 2B are voice subnetwork 111 of POTS network 110, having a multiplicity of SSPs 211; signaling subnetwork (SS7) 112 of POTS network 110 having a multiplicity of signaling components 215 (illustratively, only are shown in FIG. 2B; and packet network 120 having a multiplicity of POPS. Illustratively, only six SSPs, three paired signaling components 215 and four POPs 221 are shown in FIG. 2B (routers have been omitted); typically, the POTS network would have many more SSPs, the SS7 subnetwork would have many more paired signaling components, and there would be many more POPs associated with the Internet. The number or percentage of SSPs 211, signaling components 215 and POPs 221 that may be associated with the POTS and packet networks is not important.

POTS/Packet Bridge 140 can be used to achieve scalability—that is, to enable servicing of a wide range of users, from hundreds to millions—by replicating the access objects of the POTS/Packet Bridge described above with reference to FIG. 2A. Replication of access objects may be done in a way such that access objects are matched up (i.e., paired with or placed in the vicinity of) the respective access points of the POTS network (i.e., the SSPs 211 and the signaling components 215) and packet network (i.e., POPs 221). Thus, as illustratively shown in FIG. 2B, a separate payload object 201 is paired with each of the six SSPs 211, such that POTS/Packet Bridge 140 has access to and can communicate with voice subnetwork 111 through any one of the six SSPs 211. Similarly, as illustratively shown in FIG. 2B, a separate signaling object 202 is paired with each of the three signaling components 215, such that POTS/Packet Bridge 140 has access to and can interact with signaling subnetwork 112 through any one of the three signaling components 215; and a separate packet object 203 is paired with each POP 221, such that POTS/Packet Bridge 140 has access to and can communicate with packet network 120 through any one of the four POPs 221.

POTS/Packet Bridge 140 may in addition achieve scalability in a geographic sense through use of a network for communications path 220, such as, e.g., a packet network, that permits ease of communication between the access objects and the other objects of POTS/Packet Bridge 140 that may be distributed over a wide area—indeed, covering virtually any geographic area desired. Thus, access objects such as payload objects 201, signal objects 202 and packet objects may be spread across a geographic area and even placed geographically distant from each other and from other objects of POTS/Packet Bridge 140, and they may all be linked through communications path (i.e. a network) 220. In this way, access objects may be, if desired, spread across the United States (or even across the globe) while communications management object 204 and, where utilized, application database 205 and application resource object 206 may be centrally located.

Thus, scalability may be achieved by providing separate access objects for virtually any number of access points into each of the POTS and packet networks, respectively, (i.e., by replicating access objects). Alternatively, scalability may be achieved by varying the number of access objects in relation to the number of access points of the respective networks (e.g., matching a single payload object to a multiplicity or plurality of available SSPs such that the payload object handles voice/data traffic between the POTS/Packet Bridge and the SSPs); that is, access objects may be shared by a multiplicity of access points (thus, e.g., a number SSPs may share a common payload object through the ability of linking the payload object to one or more of the multiplicity or plurality of access points at any one time). In an another alternative, scalability may be obtained through a combination of replication and sharing of access objects.

Communications Services

In accordance with the present invention, a combination of the above listed objects can be used to enable a very comprehensive set of service offerings accessible through either the POTS or the packet network using the POTS/PACKET Bridge. Among the services and service extensions that could be provided using the POTS/Packet Bridge are the following:

easy point-and-click interface for
      initiation of POTS conference calls
      POTS messaging services
      mobility manager/personal assistant preferences
    call scheduling for calls to service bureaus and help lines
    remote medical services improved customer care
maintenance help lines
seat reservation services with views from selected seats
purchasing services/enhanced catalog ordering
confirmation of orders/order tracking.

Several important advancements in communications services are enabled with the POTS/Packet Bridge. One of the key advancements is in intelligent communications management.

1. Intelligent Communications Management

Using the POTS/Packet Bridge, intelligent communications management services are enabled that incorporate programmed intelligence to direct the manner in which inbound or outbound calls are managed. Applications in this category may include outbound predictive dialers, automatic incoming call routing (using ANI and DNIS information), and call scheduling. Further, the POTS/Packet Bridge may be used to make dynamic switching and routing decisions between the POTS network and the packet network based upon desired quality, time, cost and other considerations, such as bandwidth. Further, the POTS/Packet Bridge can be used to set-up a conference call with the convenience of a point-and click PC interface; the teleconference can be bridged among participants in both the POTS network and the packet network.

Figure 3A:
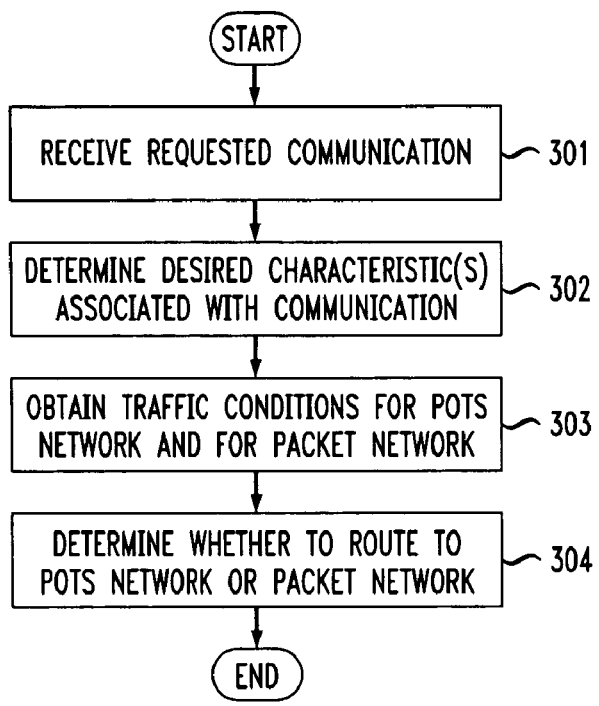
FIG. 3A demonstrates one example of intelligent communications management in accordance with the present invention.

FIG. 3A provides an example of intelligent communications management in accordance with the present invention. In response to a requested communication (e.g., voice connection from one location to another) received at step 301, the POTS/Packet Bridge at step 302 determines one or more desired characteristic(s) associated with the requested communication, such as, e.g., security, quality of service, cost or user preference (such as a preferred communications mode for contacting another, e.g. voice contact, or a preferred mode for being contacted by another, e.g., by messaging). At step 303, the POTS/Packet Bridge obtains traffic conditions of the POTS network and the packet network, such as, e.g., by monitoring switch traffic or querying routers. At step 304, the POTS/Packet Bridge determines from the traffic conditions and from the desired characteristic(s) associated with the requested communication whether to route the communication to the POTS network or to the packet network.

Figure 3B:
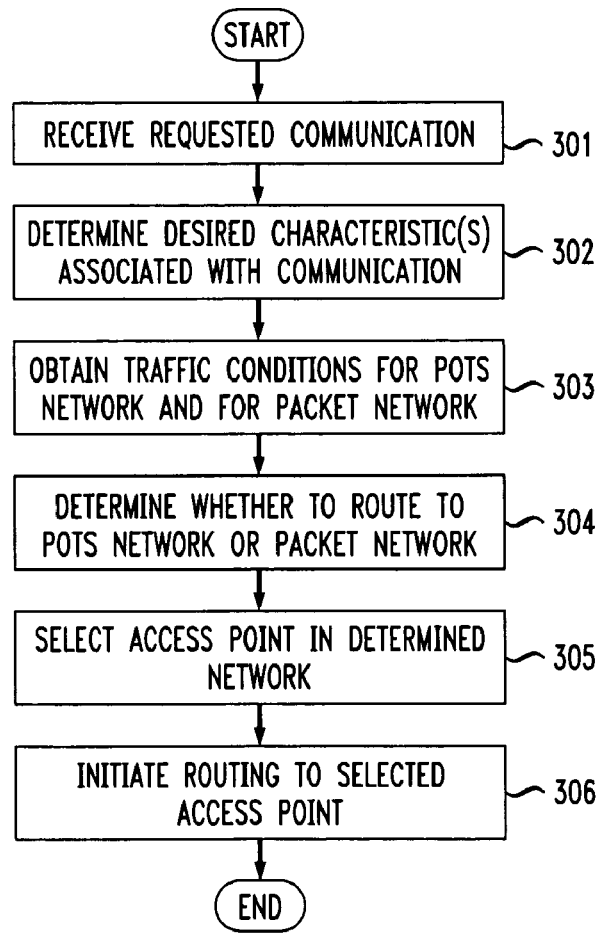
FIG. 3B demonstrates another example of intelligent communications management in accordance with the present invention.

Optionally, as shown in FIG. 3B, the POTS/Packet Bridge at step 305 selects an access point of the determined network (i.e., either the nearest SSP in the POTS network or the nearest POP in the packet network) to which the communication is to be routed, and at step 306 initiates the routing of the communication to the selected access point for the determined network. Routing decisions, i.e., deciding to which SSP or POP the communication should be routed, may be made based upon cost, traffic, user preferences, or a combination of these. User preferences (e.g., for the calling party or the called party) may, as discussed above, be included in an optional AUR database or, alternatively, in another database accessible through the POTS network or the packet network.

Incorporation of an AUR database object into the POTS/Packet Bridge permits additional intelligent communications management capabilities, by providing a convenient mechanism for a user to dynamically manage a personal registry through a graphical PC interface, and by providing callers a way to contact the user by accessing the registry by either telephone or PC. For callers wishing to contact an individual, the AUR may be consulted to determine the called party's preferred reach strategy, and the contact may then be initiated automatically using the POTS/Packet Bridge. The AUR could also be used to assist in scheduling a teleconference for a time when all critical participants are available. Additional Intelligent Call Management services include:

enhanced outbound dialers (e.g., "click-2-dial", "Call Me Back", call scheduling)
"Find Me" service (i.e., automatically dial a series of numbers in an attempt to locate the called party)
Mobility Manager/Personal Assistant (e.g., direct incoming calls/information to a multimedia mailbox instead of ringing the phone)
personal information manager (e.g., appointment reminders)

Other categories of new or extended service applications enabled by the POTS/Packet Bridge include multimedia enhanced voice calls, a universal multimedia mailbox, and universal information access and transaction processing.

2. Multimedia Enhanced Voice Calls

Another category of services that may be handled through the POTS/Packet Bridge is multimedia enhanced voice calls—namely voice calls with shared Web pages, shared documents, shared white boards, etc. For a variety of situations, involving customer care, purchasing, and fact-finding, a voice call to a knowledgeable representative is a convenient way to receive personal attention, and coordinated or shared visual communications assists clear communication of complicated concepts.

In accordance with the POTS/Packet Bridge of the present invention, applications can be created where personal interaction over the telephone can be supplemented by information available on the Web or locally within the PC, e.g., graphics, text, images, data files, etc. For example, the POTS/Packet Bridge enables a small business representative on the Internet to complement telephone sales with interactive multimedia (e.g., images, video, audio), thereby providing the prospective customer with personal attention and more-relevant information to encourage the sale. This capability may be provided through interconnectivity of the POTS and packet networks via the POTS/Packet Bridge, without the need for an elaborate and expensive Call Center. To illustrate, consider a scenario in which a buyer searches the Web for information concerning a desired product. The search leads to a seller's Web page which contains information (e.g., specs, pictures) for the entire product line. The buyer is uncertain about which model would best suit his/her needs. By clicking a "call-me back" button, the buyer instantly receives a phone call from the seller's sales force. The salesperson is able to interact directly with the prospective buyer and, using the power of the POTS/Packet Bridge, to send specific Web pages to the buyer's PC while providing personal guidance to encourage the sale. The buyer's IP address may be preserved through the buyer's Web interaction with the seller's Web site, or the Active User Registry (AU R) could be used to obtain an IP address for the buyer's PC.

There are several alternatives to the above scenario. For instance, a voice call could be initiated by the buyer to place an order. As the order progresses, an agent of the seller may send graphics (or video) to the buyer's PC to illustrate certain features of the product. If the buyer is not logged onto a PC, the seller's information could be directed to the buyer's multimedia mailbox (for later retrieval) by invoking the Universal Messaging capability of the POTS/Packet bridge.

In addition to the sales interaction just described, other multimedia enhanced voice services that the POTS/Packet Bridge supports include:
document conferencing (e.g., voice over POTS and document editing over packet)
remote medical services (e.g., patient X-ray image viewing and simultaneous telephone consultation)

improved customer care (e.g., caller ID automatically triggers a screen to display customer account information; Web page "shadowing")

maintenance help lines (e.g., user manuals, schematics sent by consultant)

ticket reservation services (with virtual viewing to help select seats)

purchasing services and enhanced catalog ordering (salesperson can "push" Web content to help make a sale)

3. Universal Multimedia Mailbox

The POTS/Packet Bridge can offer a more convenient and full-featured access to a user's universal mailbox by leveraging the multimedia nature of the Internet. While universal mailbox services typically rely on a graphical user interface (e.g., Microsoft Exchange) or a telephone interface (e.g., AUDIX®), a universal mailbox service enhances productivity by consolidating several communications points. The architecture shown in FIGS. 2A and 2B enables a powerful universal messaging service. For example, clickable hypertext links to messages allow retrieval of e-mail, voice mail, or fax messages from any computer while preserving the multimedia content of the original object (e.g., audio, images, recorded voice). That is, e-mail, voice mail, or fax messages may be stored in different sites and accessed or retrieved via links when desired. The multimedia mailbox could be used to schedule the delivery and storage of audio and video content which has been requested by the user from either the Internet or from a telephone.

When telephone access is more convenient (e.g. on-the-road), interactive voice response capabilities along with media conversion (e.g., text-to-speech conversion) could be invoked, allowing, e.g., remote users to have e-mail (as well as the textual portions of fax documents) read over the phone using text-to-speech technology. Active messages may allow the user to interact with a message and return simple or complex responses (e.g. delayed flight information). Further, message "objects" can be stored, printed, forwarded, etc. using a variety of well-developed methods.

Messages can be retrieved by any access (POTS network or packet network) to the message store (i.e., the message repository). The message transmission can go through the POTS/Packet Bridge to move the message or to perform media conversion of the message format (e.g., text to speech or fax to speech). If the message client is on the same network as the message store, no access to the bridge is normally needed, unless media conversion is required. However, if the message client is not on the same network as the message store, then the POTS/Packet Bridge of the present invention can be utilized to move the message to the appropriate network, and, optionally, to perform media conversion.

Other Universal Multimedia Mailbox services include:

audio/video 'on demand' for instantaneous viewing and/or storage (e.g., music and video retrieval)

announcements, news and pre-scheduled information delivery

4. Universal Information Access and Transaction Processing

The POTS/Packet Bridge enables an enhanced IVR capability in which callers can retrieve information from a Web-based server using the telephone as an input/output device. Using the POTS/Packet Bridge to create an integrated network enables play back of audio files or synthesized speech over the caller's phone, or sending of a fax. As an example, a telephone may be used in conjunction with the POTS/Packet Bridge for convenient access to an Internet Web server to retrieve information which is immediately "read" over the POTS network by playing a sound file. In addition, a user can select pieces of information (e.g., certain Web pages from a site) to be delivered to a multimedia device (such as a PC) or to a multimedia mailbox. The AUR could be used to determine the user's IP address.

Further, by converting HTML-like commands into audio server requests, use of a language such as the Phone Markup Language (PML) permits Internet content to be accessed from a POTS phone. By including optional PML interpreters as part of the POTS/Packet Bridge, IVR applications can be written with the ease of generating a personal home page. Additional Universal Information Access and Transaction Processing services include:

Phone Markup Language applications (e.g., banking, sales information, stock prices, weather, etc.)

Confirmation of orders and tracking (with access by phone or PC, scheduled delivery of requested information to a multimedia mailbox or on-line PC).

In summary, the POTS/Packet Bridge of the present invention combines the POTS network and a packet network, taking full advantage of the signaling capabilities present in the POTS network as well as the addressing capabilities inherent in a packet network, to seamlessly combine the networks for flexible and optimal communications based upon considerations such as desired quality, time, cost or bandwidth.

What has been described is merely illustrative of the application of the principles of the present invention. Other arrangements and methods can be implemented by those skilled in the art without departing from the spirit and scope of the present invention.

The invention claimed is:

1. A system implemented in hardware of a computer-based platform for bridging a first communications network having a payload subnetwork and a signaling subnetwork with a second communications network that is packet-switched, comprising:

a communications management object that coordinates a transfer of information between the first communications network and the second communications network;

a plurality of payload objects linked to the communications management object, wherein each payload object of the plurality of payload objects transfers payload information between the system and the payload subnetwork of the first communications network;

a plurality of signaling objects linked to the communications management object, wherein each signaling object of the plurality of signaling objects transfers signaling information between the system and the signaling subnetwork of the first communications network in accordance with a signaling protocol associated with the signaling subnetwork; and a plurality of packet objects linked to the communications management object, wherein each packet object of the plurality of packet objects transfers payload and address information between the system and the second communications network in accordance with a communications protocol associated with the second communications network.

2. The system according to claim 1, further comprising a network for linking the plurality of payload objects, the plurality of signaling objects and the plurality of packet objects to the communications management object.

3. The system according to claim 1, wherein physical locations of the plurality of payload objects, the plurality of signaling objects and the plurality of packet objects are spread across a geographic area.

4. The system according to claim 1, wherein at least one of the plurality of payload objects is linked to a plurality of access points contained within the payload subnetwork of the first communications network.

5. The system according to claim 1, wherein at least one of the plurality of signaling objects is linked to a plurality of access points contained within the signaling subnetwork of the first communications network.

6. The system according to claim 1, wherein at least one of the plurality of packet objects is linked to a plurality of access points contained within the second communications network.

7. A method of bridging a first communications network having a payload subnetwork and a signaling subnetwork with a second communications network that is packet-switched, comprising:
    establishing a first plurality of communications links to the payload subnetwork of the first communications network for communicating payload information;
    establishing a second plurality of communications links to the signaling subnetwork of the first communications network for communicating signaling information in accordance with a signaling protocol associated with the signaling subnetwork;
    establishing a third plurality of communications links to the second communications network for communicating information in accordance with a communications protocol associated with the second communications network; and
    coordinating a transfer of information between the first communications network and the second communications network using one of the first plurality of communications links, one of the second plurality of communications links and one of the third plurality of communications links.

8. The method according to claim 7, wherein at least one of the first plurality of communications links is established through one of a plurality of available access points contained within the payload subnetwork of the first communications network.

9. The method according to claim 7, wherein at least one of the second plurality of communications links is established through one of a plurality of available access points contained within the signaling subnetwork of the first communications network.

10. The method according to claim 7, wherein at least one of the third plurality of communications links is established through one of a plurality of available access points contained within the second communications network.

11. A system implemented in hardware of a computer-based platform for bridging a first communications network having a payload subnetwork and a signaling subnetwork with a second communications network that is packet-switched comprising:
    a communications management object being configured to coordinate a transfer of information between the first communications network and the second communications network;
    a payload object linked to the communications management object, the payload object being configured to transfer payload information between the system and the payload subnetwork of the first communications network;
    a signaling object linked to the communications management object, the signaling object being configured to transfer signaling information between the system and the signaling subnetwork of the first communications network in accordance with a signaling protocol associated with the signaling network;
    a packet object linked to the communications management object, the packet object being configured to transfer payload and address information between the system and the second communications network in accordance with a communications protocol associated with the second communications network; and
    an application database linked to the communications management object, the application database being configured to determine a preferred communications mode of a called user for establishing communications contact with another user.

12. The system according to claim 11, wherein the application database is an active user registry database configured to store communications contact information of the called user including at least one of: a telephone number, a facsimile number, a mobile telephone number, or an e-mail address.

13. The system according to claim 12, wherein the active user registry database is further configured to store at least one of: a set of user profiles and at least one user's preferred communications option.

14. The system according to claim 11, further comprising an application resource object that is configured to coordinate a handling of operations, administration, maintenance and provisioning functions.

15. The system according to claim 14, wherein the application resource object and the application database are each linked to the communications management object.

16. The system according to 11, wherein the application database is configured to determine a user's internet protocol address.

17. The system according to claim 11, wherein the application database includes a data set to support a plurality of service applications.

18. The system according to claim 11, further comprising:
    a phone markup language interpreter linked to the communications management object.

19. The system according to claim 18, wherein the phone markup language interpreter is configured to convert hypertext markup language-like commands into audio server requests.

20. The system according to claim 18, further comprising an application resource object that is configured to handle interactive voice response applications.

21. The system according to claim 18, further comprising an application resource object that is configured to handle phone markup language applications.

22. The system according to claim 21, wherein the phone markup language applications include at least one of: a banking application, a sales information application, a stock price application, or a weather application.

23. The system according to claim 18, further comprising an application resource object that is configured to handle order confirmation and tracking.

* * * * *